United States Patent [19]
Ito

[11] Patent Number: 5,829,129
[45] Date of Patent: Nov. 3, 1998

[54] WIRING HARNESS AND METHOD OF PRODUCING THE SAME

[75] Inventor: Takeharu Ito, Yokkaichi, Japan

[73] Assignee: Sumitomo Wiring Systems, Ltd., Yokkaichi, Japan

[21] Appl. No.: 806,397

[22] Filed: Feb. 26, 1997

Related U.S. Application Data

[62] Division of Ser. No. 515,005, Aug. 14, 1995, abandoned.

[30] Foreign Application Priority Data

Aug. 31, 1994 [JP] Japan ..................................... 6-207057

[51] Int. Cl.$^6$ .................................................. H01R 43/00
[52] U.S. Cl. ................................ 29/857; 29/755; 29/33 F; 174/72 A; 439/502; 439/623
[58] Field of Search ............................. 29/755, 872, 857; 174/72 A; 439/502, 623

[56] References Cited

U.S. PATENT DOCUMENTS

| | | |
|---|---|---|
| 3,287,681 | 11/1966 | Caldwell . |
| 4,017,772 | 4/1977 | Burnside . |
| 4,280,062 | 7/1981 | Miller et al. . |
| 4,764,662 | 8/1988 | Andersen et al. . |
| 4,799,899 | 1/1989 | Endo . |
| 4,835,858 | 6/1989 | Adlon et al. ............................ 29/755 X |
| 4,875,286 | 10/1989 | Leandris et al. ............................ 29/872 |
| 5,203,720 | 4/1993 | Zini . |
| 5,365,659 | 11/1994 | Ueda et al. ............................ 29/755 X |
| 5,536,904 | 7/1996 | Kojima et al. . |
| 5,546,950 | 8/1996 | Schoeckert et al. . |
| 5,610,447 | 3/1997 | Nishikawa et al. ................... 29/755 X |
| 5,610,454 | 3/1997 | Nishikawa et al. ................... 29/755 X |
| 5,659,954 | 8/1997 | Ikeda et al. ............................ 29/755 X |

FOREIGN PATENT DOCUMENTS

| | | |
|---|---|---|
| 6-5120 | 1/1994 | Japan . |
| 2268636 | 1/1994 | United Kingdom . |

Primary Examiner—Carl J. Arbes
Attorney, Agent, or Firm—Greenblum & Bernstein, P.L.C.

[57] ABSTRACT

A wiring harness comprising: a plurality of provisional bundling harnesses which are obtained by performing subassembly such that a pair of terminals contact bonded to opposite ends of each of a plurality of first wires of each of the provisional bundling harnesses are, respectively, connected to connectors and each of which includes at least one second wire acting as a common circuit such that a conductor is exposed at a distal end of the second wire; wherein when the provisional bundling harnesses are finally bundled into the wiring harness, the exposed conductors of the second wires are bundled at one location and are electrically connected to one another integrally so as to form an electrically connected portion.

3 Claims, 6 Drawing Sheets

WIRING HARNESS AND METHOD OF PRODUCING THE SAME

This application is a division of application Ser. No. 08/515,005, filed Aug. 14, 1995, now abandoned.

BACKGROUND OF THE INVENTION

The present invention generally relates to wiring harnesses and more particularly, to a wiring harness and a method of producing the wiring harness, in which splice portions for common circuits are eliminated from provisional bundling harnesses obtained by performing subassembly such that the common circuits can be connected to one another when the provisional bundling harnesses are finally bundled.

Recently, in order to cope with high productivity and production of small lot in a method of producing a wiring harness, such a method is gaining momentum in which a plurality of provisional bundling harnesses obtained by performing subassembly for corresponding systems, respectively are preliminarily formed and then, are finally bundled so as to form the wiring harness. In case a circuit for use in common exists in the wiring harness assembled in this method for such reasons as power supply to another system, signal distribution to another system or integration of an earth of another system, a splice portion is provided at one provisional bundling harness such that another provisional bundling harness is finally bundled up with this provisional bundling harness.

Figure 1:
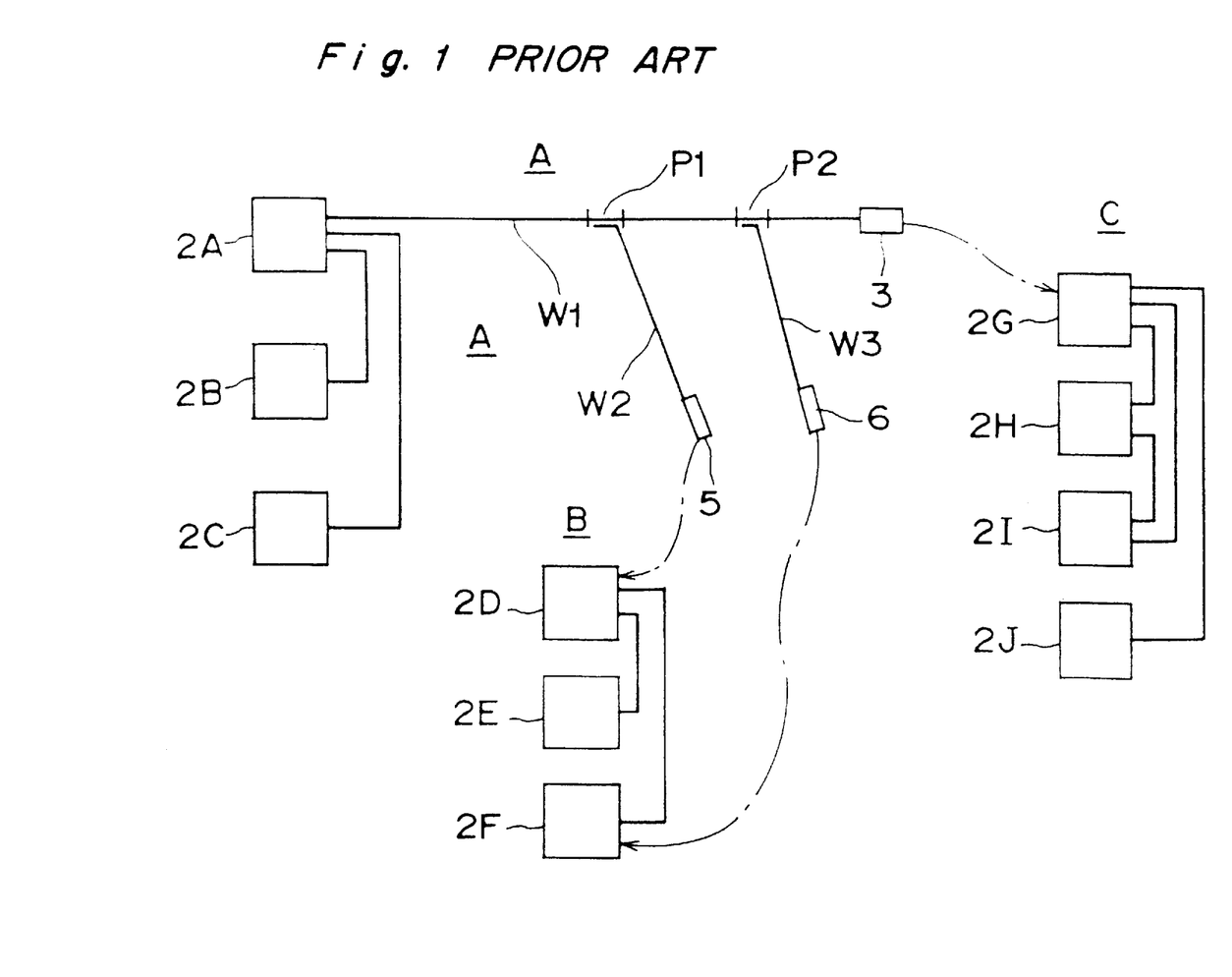
FIG. 1 is a schematic view of three provisional bundling harnesses for forming a prior art wiring harness (already referred to)

For example, three provisional bundling harnesses, i.e., first, second and third provisional bundling harnesses A, B and C are finally bundled into a wiring harness as shown in FIG. 1. If the first provisional bundling harness A has one common circuit and requires three connectors 2A, 2B and 2C, the second provisional bundling harness B has two common circuits and requires three connectors 2D, 2E and 2F and the third provisional bundling harness C has one common circuit and requires four connectors 2G, 2H, 2I and 2J, two intermediate portions P1 and P2 of a wire W1 acting as the common circuit for the first provisional bundling circuit A are scalped so as to expose a conductor of the wire W1 and wires W2 and W3 acting as the common circuits for the second provisional bundling harness B are connected to the portions P1 and P2 of the wire W1 as shown in FIG. 1.

Figure 2:
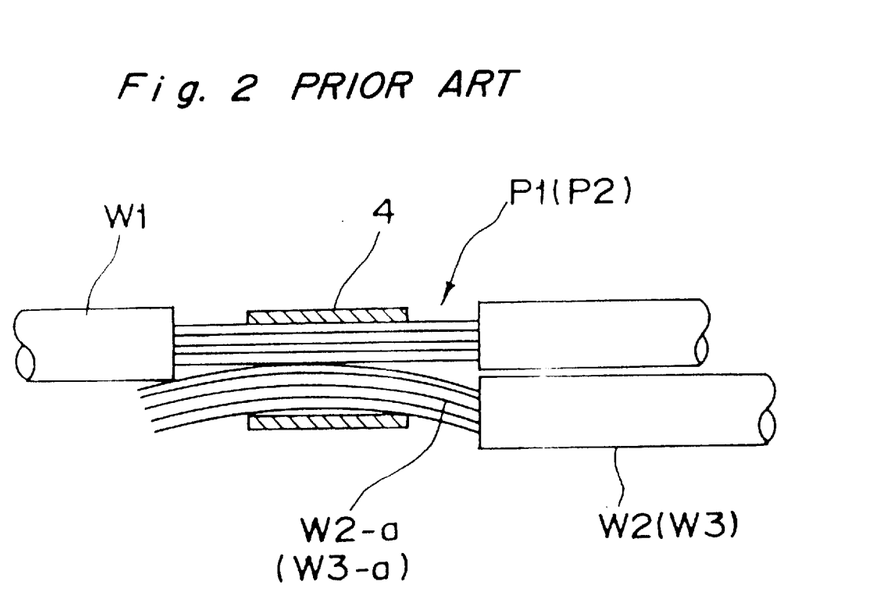
FIG. 2 is a schematic top plan view of a splice portion of the prior art wiring harness of FIG. 1 (already referred to)
Figure 3:
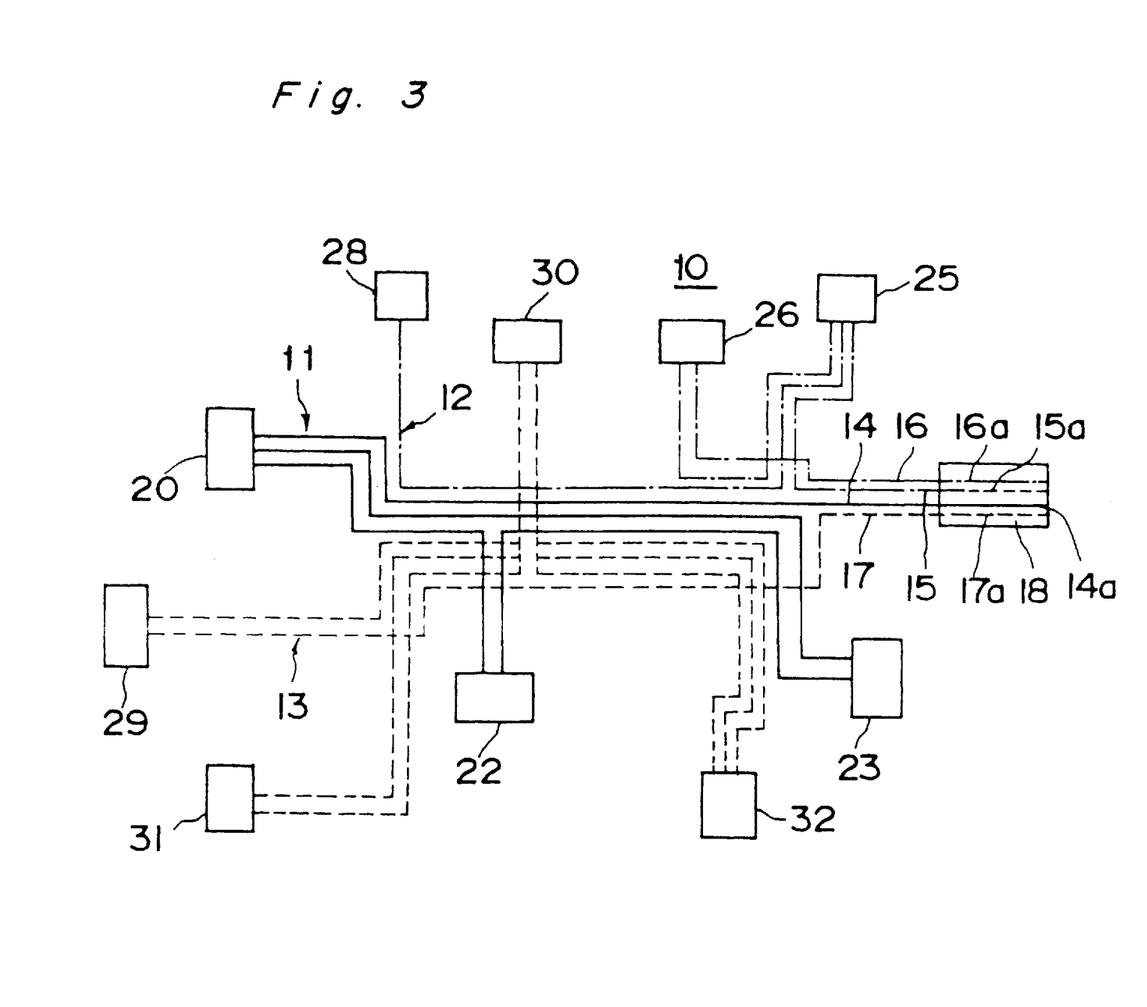
FIG. 3 is a schematic top plan view of a wiring harness according to a first embodiment of the present invention.

Namely, a terminal 3 connected to the connector 2G of the third provisional bundling harness C is contact bonded to a distal end of the wire W1 connected to the connector 2A of the first provisional bundling harness A. As shown in FIG. 2, a conductor W2—a exposed at a distal end portion of the wire W2 is bundled up with the portion P1 of the wire W1 and is contact bonded to the portion P1 by an intermediate contact bonding terminal 4 so as to form a first splice portion, while a conductor W3—a exposed at a distal end portion of the wire W3 is bundled up with the portion P2 of the wire W1 and is contact bonded to the portion P2 so as to form a second splice portion. Meanwhile, terminals 5 and 6 are connected to the other end of the wire W2 and the other end of the wire W3, respectively.

In the provisional bundling harnesses A, B and C obtained by performing subassembly, the terminal 3 disposed at the distal end of the wire W1 is connected to the connector 2G of the third provisional bundling harness C and the terminals 5 and 6 disposed at the distal end of the wire W2 and the distal end of the wire W3, respectively are connected to the connectors 2D and 2F of the second provisional bundling harness B.

In case all the provisional bundling harnesses A, B and C are finally bundled into the wiring harness, the above mentioned bundling method offers no problem. However, in case, for example, only the second and third provisional bundling harnesses B and C are bundled into the wiring harness without using the first provisional bundling wire A, the first provisional bundling harness A having the splice circuit is not used and the wiring harness cannot be formed. Therefore, in the arrangement of FIG. 1, the first provisional bundling harness A other than the second and third provisional bundling harnesses B and C should be employed for the wiring harness. If combination of the provisional bundling harnesses changes, the wiring harness may not be formed as described above, so that separation for the respective systems cannot be performed and high productivity cannot be achieved.

Furthermore, if the number of the splice portions is large, formation of the splice portions is time-consuming, thereby resulting in poor working efficiency.

SUMMARY OF THE INVENTION

Accordingly, an essential object of the present invention is to provide, with a view to eliminating the above mentioned drawbacks of the conventional wiring harness, a wiring harness and a method of producing the wiring harness, in which splice portions are eliminated from preliminarily formed provisional bundling harnesses obtained by performing subassembly such that even if combination of the provisional bundling harnesses to be assembled with one another changes, the provisional bundling harnesses can be finally bundled.

In order to accomplish this object of the present invention, a wiring harness according to the present invention comprises: a plurality of provisional bundling harnesses which are obtained by performing subassembly such that a pair of terminals contact bonded to opposite ends of each of a plurality of first wires of each of the provisional bundling harnesses are, respectively, connected to connectors and each of which includes at least one second wire acting as a common circuit such that a conductor is exposed at a distal end of the second wire; wherein when the provisional bundling harnesses are finally bundled into the wiring harness, the exposed conductors of the second wires are bundled at one location and are electrically connected to one another integrally so as to form an electrically connected portion.

In the wiring harness of the present invention, the wires acting as the common circuits for the provisional bundling harnesses are finally bundled so as to not only be integrally connected to one another but form the electrically connected portion. Therefore, a power circuit, a signal circuit, an earthed circuit, etc. can be used in common among the provisional bundling harnesses obtained by performing subassembly for the corresponding systems, respectively.

In the electrically connected portion, the bundled conductors of the second wires are welded to one another or are contact bonded to one another by a terminal fitting. Thus, a number of the conductors can be connected to one another at a time.

Meanwhile, the provisional bundling harnesses are formed for corresponding systems, respectively and a terminal contact bonded to one end of the second wire is connected to one of the connectors, while the conductor is exposed at the other end of the second wire such that the other end of the second wire is set free. Therefore, even if combination of the provisional bundling harnesses changes, the provisional bundling harnesses can be finally bundled such that the common circuits are formed.

If an insulating tape is wound around the electrically connected portion and further wires so as to insulate the electrically connected portion and the further wires, the electrically connected portion can be insulated. Especially, in case the insulating tape is wound around the electrically connected portion and the further wires simultaneously, operation for winding the insulating tape around the electrically connected portion is not required to be performed separately, thus resulting in improvement of working efficiency.

Furthermore, the present invention provides a method of producing a wiring harness, comprising the steps of: performing subassembly of a plurality of provisional bundling harnesses for corresponding systems, respectively, in each of which a pair of terminals contact bonded to opposite ends of a first wire used exclusively for each of the provisional bundling harnesses are, respectively, connected to connectors and a terminal contact bonded to one end of a second wire acting as a common circuit is connected to one of the connectors, while a conductor is exposed at the other end of the second wire such that the other end of the second wire is set free; assembling some of the provisional bundling harnesses in accordance with circuit configuration of the wiring harness such that the exposed conductors of the second wires of some of the provisional bundling harnesses are bundled at one location; electrically connecting the bundled connectors to one another integrally so as to form an electrically connected portion; and covering the electrically connected portion with insulating material.

In this method of the present invention, since the common circuits can be connected to one another collectively at a time, working efficiency can be improved greatly in comparison with conventional methods employing splice portions.

In the method, the electrically connected portion may be formed by welding the bundled conductors to one another. Ultrasonic welding or thermal pressure welding in which the bundled conductors are placed between upper and lower electrodes and voltage is applied between the upper and lower electrodes may be preferably used for welding. Meanwhile, the electrically connected portion is covered with the insulating material but a cap made of insulating material may also be put on the electrically connected portion.

BRIEF DESCRIPTION OF THE DRAWINGS

This object and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 4:
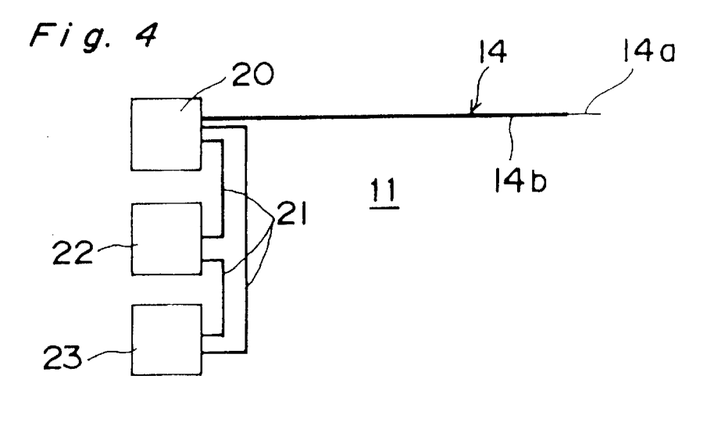
FIGS. 4, 5 and 6 are schematic top plan views showing first, second and third provisional bundling harnesses forming the wiring harness of FIG. 3, respectively.
Figure 5:
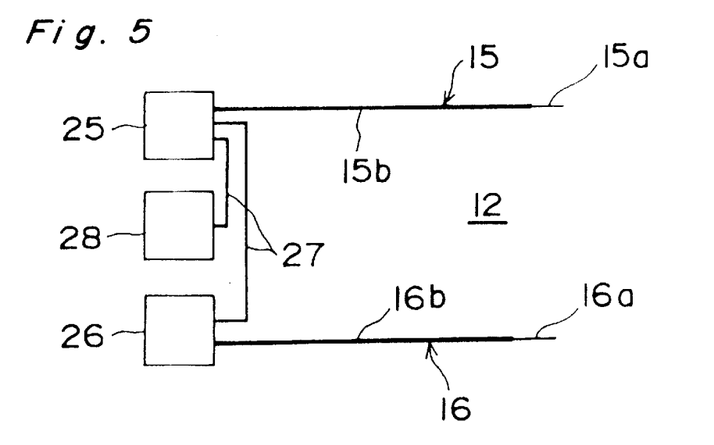
Figure 6:
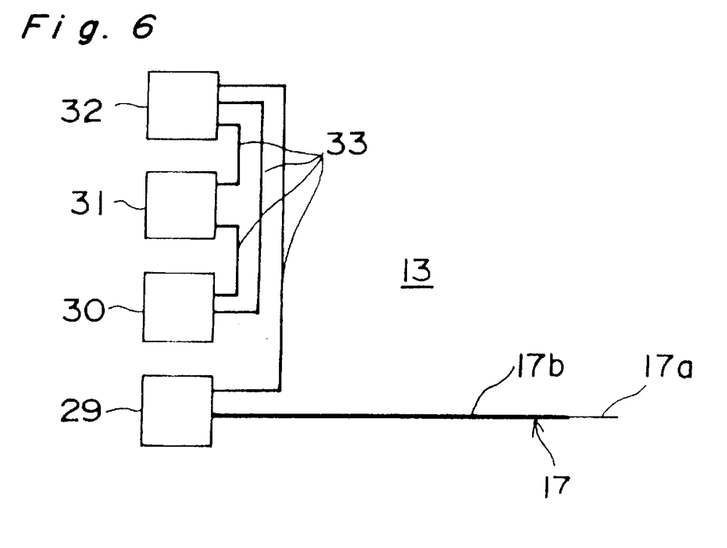

Referring now to the drawings, there is shown in FIGS. 3 to 10, a wiring harness 10 according to a first embodiment of the present invention. Three provisional bundling harnesses obtained by performing subassembly, i.e., first, second and third provisional bundling harnesses 11, 12 and 13 are preliminarily formed for corresponding systems as shown in FIGS. 4, 5 and 6, respectively and are finally bundled into the wiring harness 10.

Figure 7:
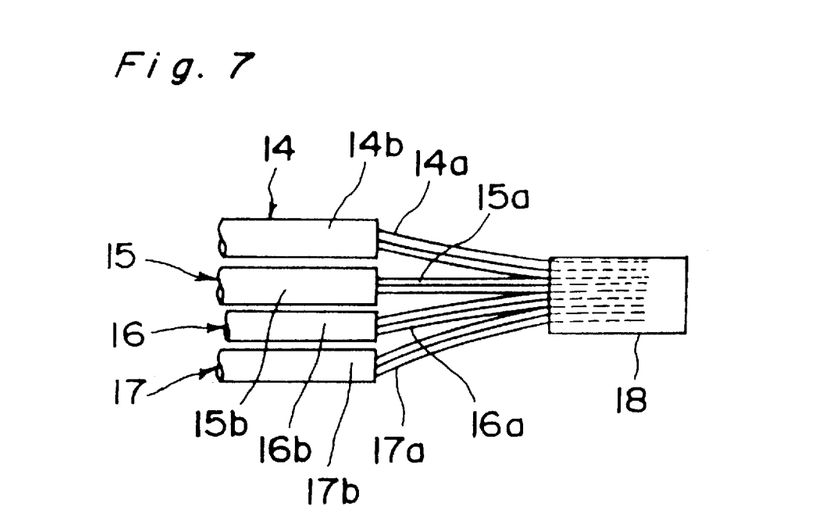
FIG. 7 is an enlarged fragmentary top plan view of the wiring harness of FIG. 3.

The first and third provisional bundling harnesses 11 and 13 include wires 14 and 17 acting as common circuits, respectively, while the second provisional bundling harness 12 includes wires 15 and 16 acting as common circuits, respectively. A terminal (not shown) to be connected to a connector is contact bonded to one end of each of the wires 14 to 17, while each of conductors 14a to 17a is exposed at the other end of each of the wires 14 to 17. As shown in FIG. 7, the conductors 14a to 17a of the wires 14 to 17 are bundled and are welded to one another by ultrasonic welding so as to form an electrically connected portion 18 such that the wires 14 to 17 are connected to one another.

More specifically, the first provisional bundling harness 11 has the wire 14 acting as a common circuit. As shown in FIG. 4, a terminal (not shown) is contact bonded to one end of the wire 14 and is inserted into a connector 20, while an insulating coating 14b is removed from the other end of the wire 14 so as to expose a conductor 14a such that the other end of the wire 14 is set free. A pair of terminals are, respectively, contact bonded to opposite ends of each of a plurality of other wires 21 forming the first provisional bundling harness 11 and are inserted into each of connectors 20, 22 and 23 such that the first provisional bundling harness 11 are subjected to subassembly.

As shown in FIG. 5, the second provisional bundling harness 12 has the wires 15 and 16 acting as common circuits, respectively. In the same manner as the wire 14 of the first provisional bundling harness 11, a terminal is connected to one end of each of the wires 15 and 16 and is inserted into each of connectors 25 and 26, while each of conductors 15a and 16a is exposed at the other end of each of the wires 15 and 16 such that the other end of each of the wires 15 and 16 is set free. A pair of terminals are, respectively, contact bonded to opposite ends of each of a plurality of other wires 27 forming the second provisional bundling harness 12 and are inserted into each of connectors 25, 26 and 28 such that the second provisional bundling harness 12 is subjected to subassembly.

As shown in FIG. 6, the third provisional bundling harness 13 has the wire 17 acting as a common circuit. Likewise, a terminal is connected to one end of the wire 17 and is inserted into a connector 29, while a conductor 17a is exposed at the other end of the wire 17 such that the other end of the wire 17 is set free. A pair of terminals are, respectively, contact bonded to opposite ends of a plurality of other wires 33 forming the third provisional bundling harness 13 and are inserted into each of connectors 29, 30, 31 and 32 such that the third provisional bundling harness 13 is subjected to subassembly.

The wires 14 to 17 acting as the common circuits, respectively are formed by circuits adapted to use in common an identical power circuit, an identical signal circuit and an earthed circuit among the first to third provisional bundling harnesses 11 to 13. Not only in the first to third provisional bundling harnesses 11 to 13 but in another provisional bundling harness, a terminal is contact bonded to one end of a wire acting as a common circuit and is inserted into a connector, while a conductor 17a is exposed at the other end of the wire such that the other end of the wire is set free preliminarily.

Figure 8:
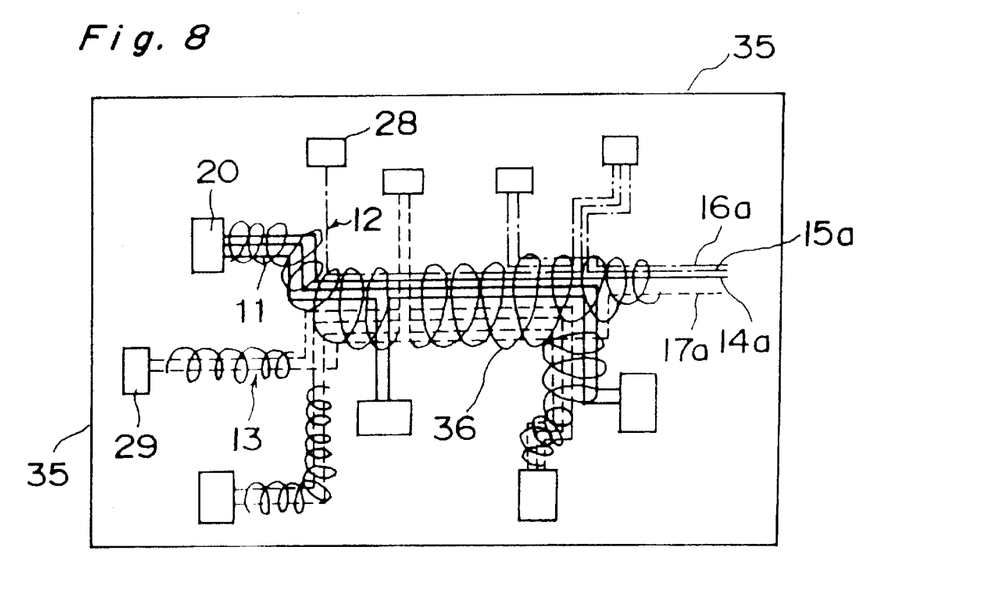
FIG. 8 is a schematic view indicative of one step in assembly of the wiring harness of FIG. 3.

The wiring harness 10 is assembled as follows. Initially, the first to third provisional bundling harnesses 11 to 13 are subjected to subassembly as described above. Subsequently, as shown in FIG. 8, the first to third provisional bundling harnesses 11 to 13 are assembled on a wiring layout board 35 and are finally bundled by winding an insulating tape 36 around the first to third provisional bundling harnesses 11 to 13. At this time, the conductors 14a to 17a exposed at the distal end of each of the wires 14 to 17 acting as the common circuits for the first to third provisional bundling harnesses 11 to 13 are disposed at an identical location as shown in FIG. 8.

Figure 9:
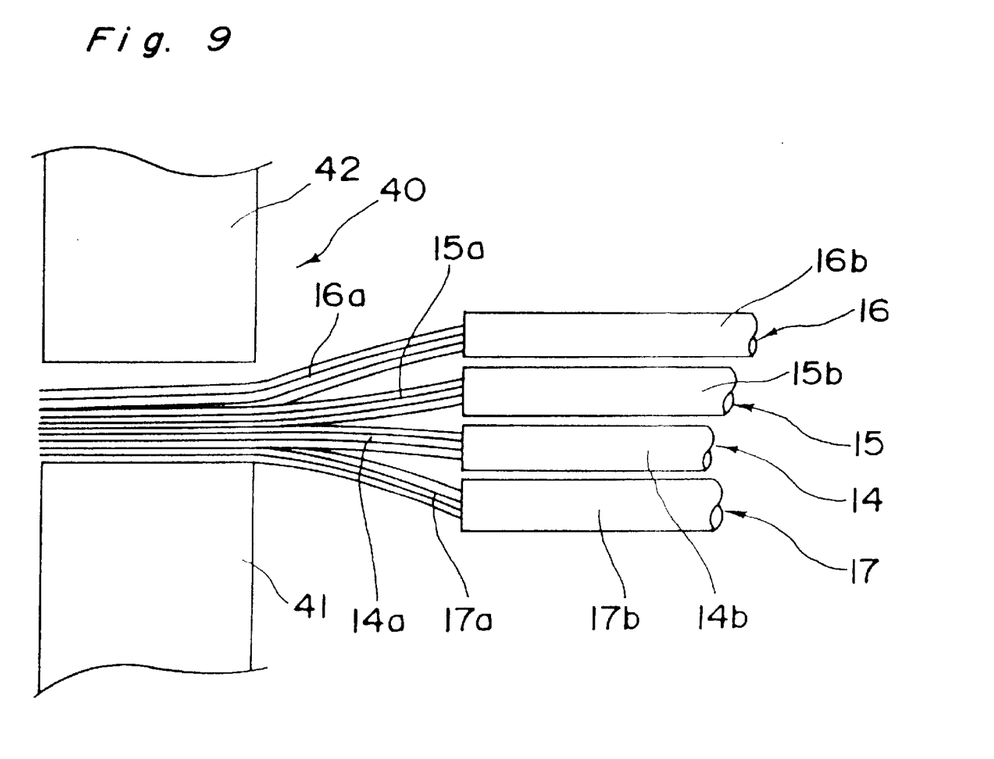
FIG. 9 is a schematic view indicative of another step in assembly of the wiring harness of FIG. 3.

Thereafter, the first to third provisional bundling harnesses 11 to 13 bundled finally as described above are picked up from the wiring layout board 35 and the bundled conductors 14a to 17a are placed on an upper face of an anvil 41 of an ultrasonic welding machine 40 as shown in FIG. 9. At this time, the circular conductors 14a to 17a are made flat so as to be closely piled on one another on the upper face of the anvil 41. In this state, a welding chip 42 coupled with a hone (not shown) is lowered so as to apply ultrasonic vibrations to the conductors 14a to 17a while pressing the conductors 14a to 17a at a predetermined pressure. As a result, the conductors 14a to 17a are integrally welded into the electrically connected portion 18.

Figure 10:
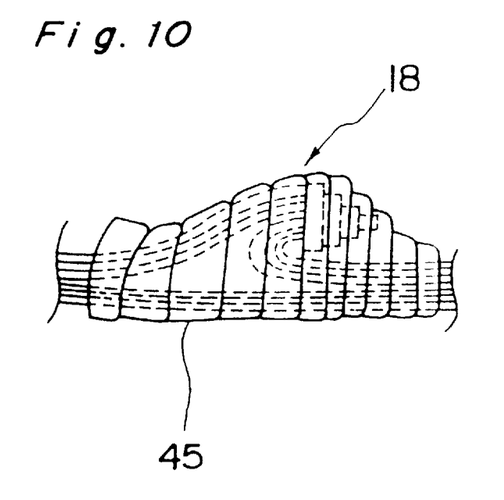
FIG. 10 is a fragmentary schematic view of the wiring harness of FIG. 3.

Then, an insulating tape 45 is wound around the electrically connected portion 18 and other wires and thus, production of the wiring harness 10 is completed. Meanwhile, in place of the insulating tape 45, an insulating cap made of insulating resin or insulating rubber may be put on the electrically connected portion 18 and other wires.

In the wiring harness 10 of the above described arrangement, since the wires 14 to 17 are connected to one another by the single electrically connected portion 18, the wires 14 to 17 can be used as the common circuits, respectively.

Figure 11:
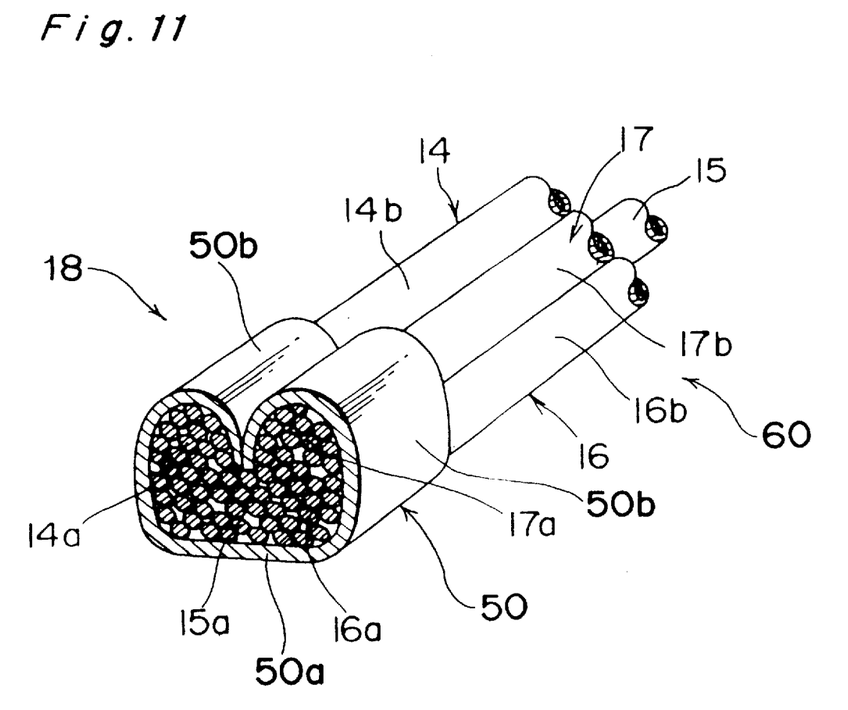
FIG. 11 is a partially broken perspective view of a wiring harness according to a second embodiment of the present invention.

FIG. 11 shows a wiring harness 60 according to a second embodiment of the present invention. In the wiring harness 60, the exposed conductors 14a to 17a of the wires 14 to 17 acting as the common circuits are contact bonded to one another by a contact bonding terminal fitting 50 so as to form the electrically connected portion 18. The contact bonding terminal fitting 50 is formed by bending an electrically conductive metal plate and includes a pair of opposed barrel portions 50b projecting from a bottom portion 50a. The barrel portions 50b are curved by a contact bonding apparatus (not shown) so as to be contact bonded to the conductors 14a to 17a. In the same manner as the first embodiment, an insulating tape is wound around the electrically connected portion 18 formed by using the contact bonding terminal fitting 50, and other wires, so that production of the wiring harness 60 is completed.

In the wiring harness of the present invention, each of the wires of the provisional bundling harnesses obtained preliminarily by performing subassembly, which acts as the common circuit, has the free end and the free ends of the wires of the provisional bundling harnesses are finally bundled so as to be welded to one another. Therefore, even if combination of the provisional bundling harnesses to be finally bundled changes, the wires acting as the common circuits can be bundled so as to be connected to one another into one electrically connected portion. Accordingly, since the provisional bundling harnesses can be preliminarily formed separately for the corresponding systems, respectively, production of small lot can be performed at high productivity and at low cost.

Meanwhile, in the production method of the present invention, since no splice circuit is required to be provided at the provisional bundling harnesses at the time of subassembly of the provisional bundling harnesses, the provisional bundling harnesses can be prepared easily. Furthermore, since the common wires can be connected to one another collectively at a time during final bundling of the provisional bundling harnesses, working efficiency can be improved greatly in comparison with known production methods.

What is claimed is:

1. A method of producing a wiring harness for a motor vehicle, in which after a plurality of kinds of provisional bundling wiring harnesses have been, respectively, prepared for a plurality of kinds of electrical systems, a desired wiring harness is formed by assembling the provisional bundling wiring harnesses as necessary, with the provisional bundling wiring harnesses each having at least one first wire constituting a circuit used exclusively for one of the electrical systems and at least one second wire constituting a common circuit used in common for some of the electrical systems, the method comprising the steps of:

contact bonding a first terminal to each of opposite ends of each of all the first wires;

fitting the first terminal into a corresponding one of connector housings;

exposing a conductor of one end of each of all the second wires so as to set the one end of each of the second wires free;

contact bonding a second terminal to the other end of each of the second wires without providing a splice portion on each of the second wires;

fitting the second terminal into a corresponding one of the connector housings such that a plurality of the kinds of the provisional bundling wiring harnesses are, respectively, prepared for a plurality of the kinds of the electrical systems;

selecting necessary ones of the provisional bundling wiring harnesses from the provisional bundling wiring harnesses in accordance with a circuit configuration of electrical systems required for a specific motor vehicle;

assembling the necessary ones of the provisional bundling wiring harnesses on a wiring layout board so as to dispose the conductors of the second wires at one location;

bundling the necessary ones of the provisional bundling wiring harnesses by winding an adhesive tape around the necessary ones of the provisional bundling wiring harnesses so as to bundle the conductors of the second wires at the location;

removing the necessary ones of the provisional bundling wiring harnesses from the wiring layout board;

electrically connecting the conductors of the second wires to one another integrally by using a connection apparatus so as to form an electrically connected portion; and covering the electrically connected portion with an insulating medium.

2. A method as claimed in claim 1, wherein the electrically connected portion is formed by welding the bundled conductors to one another.

3. A method as claimed in claim 1, wherein the electrically connected portion is formed by contact bonding the bundled conductors to one another.

* * * * *

UNITED STATES PATENT AND TRADEMARK OFFICE
CERTIFICATE OF CORRECTION

PATENT NO. : 5,829,129
DATED : November 3, 1998
INVENTOR(S) : T. ITO

It is certified that error appears in the above-identified patent and that said Letters Patent is hereby corrected as shown below:

On the title page:
Item [62] Related U.S. Application Data, change "515,005" to ---515,055---.

Signed and Sealed this

Twelfth Day of October, 1999

Q. TODD DICKINSON

Attest:

Attesting Officer

Acting Commissioner of Patents and Trademarks